June 20, 1933. T. H. STRACHAN 1,914,386
SAFETY DEVICE FOR FOOD SLICERS
Filed July 18, 1928    2 Sheets-Sheet 1
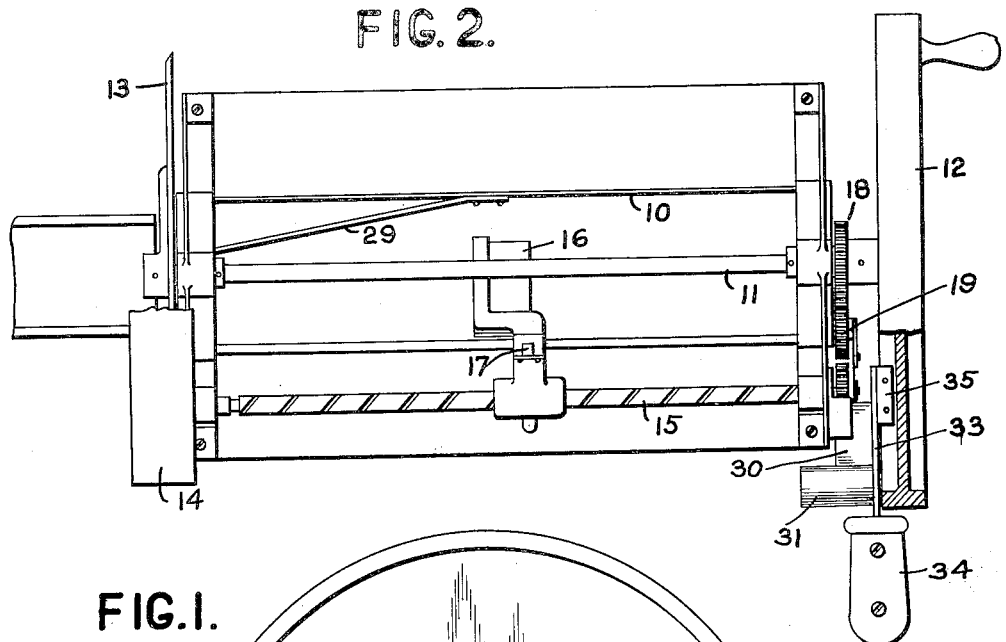
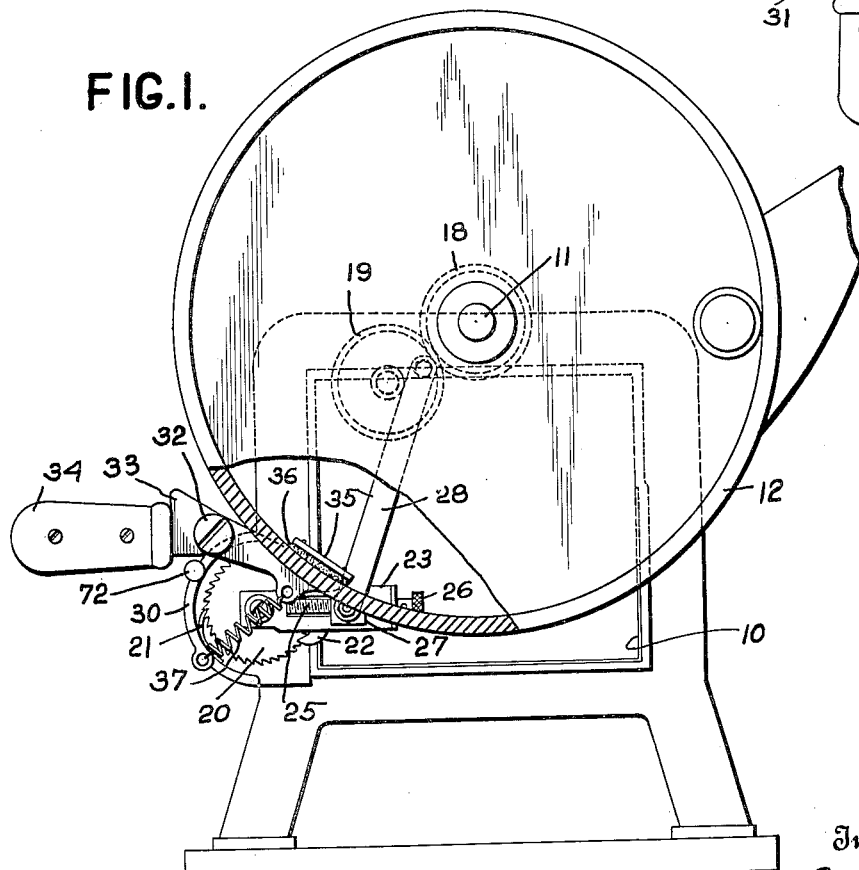
Inventor
Thos. H. Strachan
By his Attorney
W. M. Wilson June 20, 1933. T. H. STRACHAN 1,914,386
SAFETY DEVICE FOR FOOD SLICERS
Filed July 18, 1928 2 Sheets-Sheet 2

Inventor
Thos. H. Strachan
By his Attorney
W. M. Wilson

Patented June 20, 1933

1,914,386

UNITED STATES PATENT OFFICE

THOMAS H. STRACHAN, OF LYNBROOK, NEW YORK, ASSIGNOR TO DAYTON SCALE COMPANY, OF DAYTON, OHIO, A CORPORATION OF NEW JERSEY

SAFETY DEVICE FOR FOOD SLICERS

Application filed July 18, 1928. Serial No. 293,558.

This invention relates to food cutting machines, particularly to bread slicers of the type having an eccentrically shaped cutting knife with its weight unbalanced about its center.

In slicers of this type, the tendency of the knife is to maintain a position with its center of gravity vertically below its center of motion. Should the knife stop in an unbalanced condition in which it may be held by friction or by an obstruction accidentally engaging the knife, a potential force will be stored up in the knife which if the frictional force is overcome or the obstruction removed will freely swing it to its balanced position, namely, with the center of gravity vertically below the center of motion. Further, if the knife is being held by manual means in an unbalanced position and the holding force removed, the knife will swing to its balanced condition. The potential liability of the knife to move from an unbalanced to a balanced position has frequently caused serious injuries. Thus if the knife has stopped in an unbalanced position due to friction and the operator in cleaning the bread supporting table, the frame adjacent the knife, the knife guard, or even the knife itself, places his hand beneath the knife and the frictional force is suddenly overcome by a slight push or the like, the knife will suddenly swing to its balanced position and injure the operator before he is able to withdraw his hand from beneath the knife. Similarly if an obstruction has stopped the knife in an unbalanced position and the operator in removing the obstruction fails to hold the knife from moving, the knife will be apt to cause an injury to the operator's hand when the obstruction has been removed and the knife swings to its normal balanced position. Even if the knife is retained in unbalanced position while the operator, for some reason, has his hand under the knife, by holding the knife actuating handle or other connected part, the release of the holding force due to forgetfulness, awkwardness of position, or ignorance will permit the knife to move to its normal position and in so doing injure the operator.

The object of this invention is therefore to provide means for preventing occurrence of injuries to operators due to above mentioned causes.

More specifically, the object is to provide a bread slicer having a knife of the unbalanced type with means for normally overcoming the tendency of the knife to freely move from an unbalanced to a balanced position.

Further, the object is to provide a slicer of the manually operated type which will require the operator to use both hands in operating the slicer, both hands being far removed from the knife.

Still further, the object of the invention is to provide a manually operated brake normally engaging a link in the actuating mechanism of the knife.

For the purposes of illustration, the invention has been shown as applied to a bread slicer disclosed in Patent No. 1,595,211 to A. R. Mulder although it is understood that the invention is broadly applicable to other slicers, whether for meat or bread, in which an unbalanced knife is employed.

Fig. 1 is an end view of the bread slicer;

Fig. 2 is a top plan view of the slicer, and;

Figure 3:
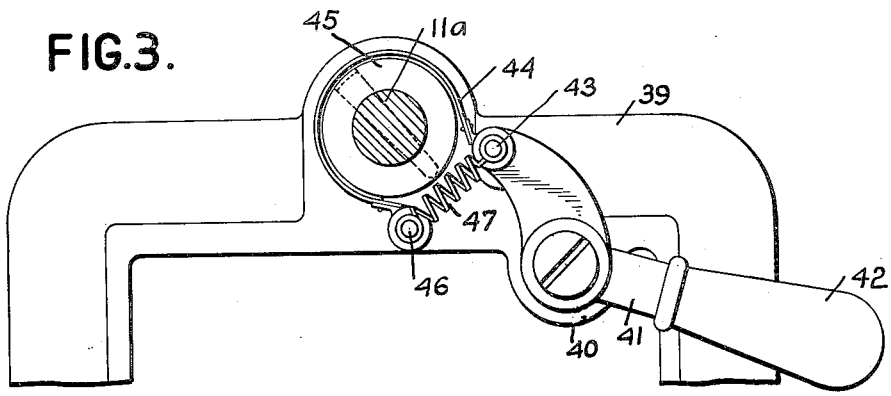
Figure 4:
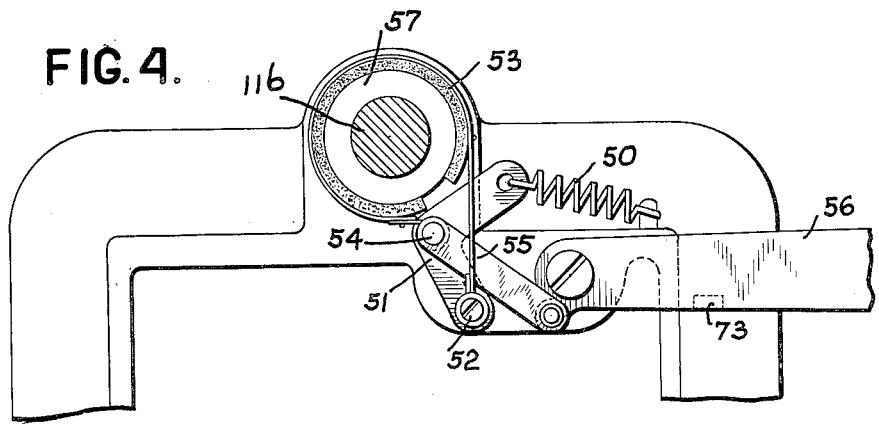
Figure 5:
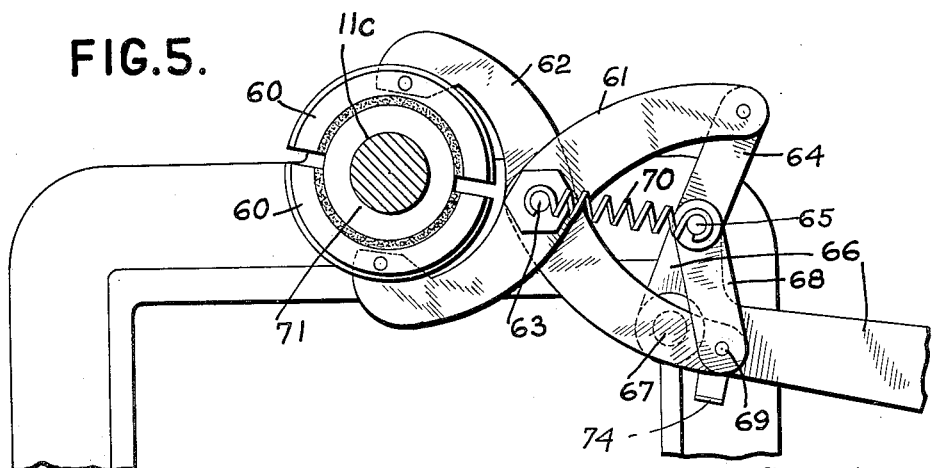

Figs. 3, 4, and 5 are detail views of different modifications of the invention.

The slicing machine disclosed in the patent to Mulder, above referred to, comprises the usual frame parts and the rectangular bread chute 10 and also is provided with the main shaft 11 carrying upon one end the handwheel or flywheel 12 and upon the other the knife 13. The knife is guarded in the usual housing 14. Also rotatably mounted in the frame is the threaded shaft or feed screw 15 which is adapted to periodically advance the bread carriage comprised of jaw members 16 and a handle or grip portion 17 having the usual provisions for engaging and disengaging the feed screw. The above parts being well known in the art require no detailed description.

For periodically rotating the threaded feed shaft 15 for feeding the bread forward after each slice is cut, the following instrumentalities are provided. Fixed to the main shaft 11 is a pinion 18 which meshes with a gear 19 rotatably mounted upon the frame of the machine. Adjacent thereto and fixed to the feed shaft is a ratchet 20 having a suitable coacting restraining pawl 21. Coacting with the ratchet is a feed pawl 22 pivotally mounted upon a bifurcated pawl arm 23. This arm at one end is pivotally mounted upon an extended unthreaded end of the feed shaft 15 and carries a threaded stud 25 having fixed upon one end a knurled knob 26. Slidable relatively to the arm 23 is a block or slide 27 provided with suitable threads engaging the threaded shaft so as to be displaced in or out relatively to the shaft upon the turning of knob 26. Pivotally connected to the block is a pitman 28 having its upper end pivotally connected to the idler gear 19. Upon rotation of the main shaft 11, gear 18 rotates gear 19 which causes arm 28 to oscillate. Each oscillation of arm 28 rotates the ratchet wheel through pawl arm 23 and pawl 22. Rotation of the ratchet wheel causes feed shaft 15 to advance the bread carrier. By adjusting block 27 on the screw 25, the movement of pawl 22 may be adjusted and the feeding of the bread carrier regulated in accordance with the thickness of slice desired. A flat spring blade 29 is provided to guide the bread in the chute 10.

The above described structure forms per se no part of the invention except in combination with and as modified by the following parts.

Referring to Figs. 1 and 2, an arcuate guard 30 shielding the outwardly projecting portion of the ratchet wheel 20 is provided with a boss 31 carrying a pivot pin 32 on which is rotatably journalled a lever 33. The outer end of the lever carries a handle 34. The inner end of the handle is formed with a flat plate 35 extending above the inner flange of the flywheel 12. The bottom of the plate 35 is faced with a braking material 36 such as a strip of leather.

A spring 37 attached at one end to the guard 30 and at its other end to the lever 33 normally holds the braking strip 36 in contact with the inner flange of the flywheel. In order to release the brake from the flywheel, it is necessary to grasp handle 34 and rock the lever counterclockwise against the influence of spring 37, thereby lifting the inner end of the lever out of engagement with the flywheel. Thus normally the flywheel is locked by brake 36 under the force of spring 37 and in order to allow the flywheel to move it is necessary to keep holding handle 34 down. Accidental movement of the flywheel and the knife connected thereto is thus rendered impossible. The knife may be stopped in any position desired without danger of its falling to a balanced position and injuring the operator or person repairing the machine. Furthermore, in order to operate the machine, it is necessary to use both hands, one for turning the flywheel and the other for holding the brake in released position. The operator cannot, as a result, turn the knife with one hand and insert his other hand beneath the knife either for adjusting a piece of bread beneath the knife, removing an obstruction therefrom, or some other reason.

Fig. 3 illustrates a modification of the invention in which the braking force is applied to the main shaft 11a. In this case, the frame 39 carrying the main shaft is provided with a boss 40 for rotatably journalling a lever 41 having a handle 42 at one end for manipulating it. The other end of the lever has a pin 43 to which is attached one end of a brake band 44 surrounding a disk 45 keyed to the main shaft 11 at the end adjacent the flywheel, the other end of the band being attached to a pin 46 carried by the frame 39. A spring 47 is fastened to both pins and constantly urges the ends of the brake band towards each other, thereby causing tight engagement of the disk 45 and the brake band and holding the shaft 11 from rotation. In order to release the shaft for rotation, it is necessary to move handle 42 down, overcoming the force of the spring 47 and permitting the brake band to leave the surface of the disk 45.

Fig. 4 illustrates another modification of the invention, showing a different linkage for controlling the position of the brake band. In this case, a spring 50 constantly urges a bell crank lever 51 clockwise about pivot 52 carried by the frame. One end of the band 53 is attached to the pivot 52 and the other end is attached to a pin 54 on lever 51. The pin 54 serves as a pivot for a link 55 connected to the lever 56. Normally the spring 50 urges pin 54 and the end of the band carried thereby towards the right, thus holding the band tightly on the disk 57 attached to the main shaft 11b. To release the brake, lever 56 is rocked downwardly, straightening link 55 and moving the end of the band attached to pin 54 to the left.

Fig. 5 shows still another modification of the invention, in which the brake is comprised of two separate semi-circular jaws 60 to one of which is pivoted a link 61 and to the other a similar link 62 crossing link 61 and pivotally connected thereto by pin 63. A link 64 is pivoted at one end to link 61 and is journalled at its other end on a pin 65 carried by the inner end of a lever 66 journalled intermediately on a pivot 67 carried by the frame. Also journalled on pin 65 is a link 68 pivotally connected to link 62 by a pin 69. A spring 70 is connected to pins 63 and 65 constantly urging the latter towards the former pin and thereby through links 64 and 68 holding the jaws 60 tightly on the disk 71 fixed to the main shaft 11c. In order to release the brake jaws from the disk, it is necessary to rock lever 66 clockwise moving pin 65 away from pin 63.

Stops are provided in each form of the invention to limit the movement of the brake controlling levers. Thus in Fig. 1, a stop 72 is provided on guard 20 and in Figs. 4 and 5, respectively, lugs 73 and 74 on the levers serve as stops cooperating with the machine frame.

While I have shown and described and pointed out the fundamental novel features of the invention as applied to a single modification it will be understood that various omissions and substitutions and changes in the form and details of the device illustrated and in its operation may be made by those skilled in the art without departing from the spirit of the invention. I intend to be limited therefore only by the scope of the following claims.

I claim:

1. A brake for a shaft rotatable in a frame, comprising a friction band surrounding and engaging said shaft, a lever having its inner end pivoted to the said frame, said end of one end of the band being attached to the frame, the other end of said band being attached to an intermediate point of the said lever, a spring acting on the outer end of said lever to rock it in a direction to tighten the band on the shaft, and a manually-manipulative linkage acting on said intermediate point of the lever to rock it in a direction to loosen the band from the shaft.

2. A brake for a shaft rotatable in a frame, comprising a friction band surrounding a greater portion of the perimeter of said shaft, a lever pivoted to said frame, means for fixedly attaching one end of the band to the pivot of the lever, means for attaching the other end of the band directly to a movable part of the lever for movement therewith, a spring connected directly to the lever at one end and to the frame of the other end for urging said lever in a direction to tighten the band on said shaft, and a handle for moving said lever against the spring resistance in a direction to loosen the band on the shaft.

In testimony whereof I hereto affix my signature.

THOMAS H. STRACHAN.